(12) United States Patent
Wang et al.

(10) Patent No.: US 8,934,707 B2
(45) Date of Patent: Jan. 13, 2015

(54) IMAGE PROCESSING APPARATUS AND IMAGE PROCESSING METHOD

(71) Applicant: Industrial Technology Research Institute, Hsinchu (TW)

(72) Inventors: Te-Mei Wang, Hsinchu (TW); Hsiao-Wei Chen, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 103 days.

(21) Appl. No.: 13/726,821

(22) Filed: Dec. 26, 2012

(65) Prior Publication Data

US 2013/0251240 A1 Sep. 26, 2013

Related U.S. Application Data

(60) Provisional application No. 61/613,501, filed on Mar. 21, 2012.

(30) Foreign Application Priority Data

Aug. 30, 2012 (TW) .............................. 101131521 A

(51) Int. Cl.
 G06T 5/00 (2006.01)
 G06K 9/36 (2006.01)
 H04N 13/00 (2006.01)
(52) U.S. Cl.
 CPC .............. *G06K 9/36* (2013.01); *H04N 13/0011* (2013.01); *G06T 5/005* (2013.01); *G06T 2200/04* (2013.01); *G06T 2207/10028* (2013.01)
 USPC ............................ 382/154; 382/254; 382/275

(58) Field of Classification Search
 None
 See application file for complete search history.

(56) References Cited

U.S. PATENT DOCUMENTS

| 5,379,369 | A | 1/1995 | Komma et al. |
| 5,929,859 | A | 7/1999 | Meijers |
| 8,073,292 | B2 | 12/2011 | Klein Gunnewiek |
| 2009/0016640 | A1* | 1/2009 | Klein Gunnewiek ......... 382/276 |
| 2011/0023072 | A1 | 1/2011 | Hodzic et al. |
| 2011/0123113 | A1* | 5/2011 | Berretty et al. ............... 382/173 |

(Continued)

FOREIGN PATENT DOCUMENTS

| TW | 200823799 | 6/2008 |
| TW | 200948043 | 11/2009 |
| WO | 2012010220 | 1/2012 |

OTHER PUBLICATIONS

Daribo et al. "Depth-aided Image Inpainting for Novel View Synthesis." IEEE International Workshop on Multimedia Signal Processing, Oct. 4, 2010, pp. 167-170.*

(Continued)

*Primary Examiner* — Jon Chang
(74) *Attorney, Agent, or Firm* — McClure, Qualey & Rodack, LLP

(57) ABSTRACT

An image processing apparatus includes a determination unit, a search unit, a weight assignment unit and a filling unit. The determination unit determines whether a hole is surrounded by the foreground in a disparity map or a depth map. The search unit searches for multiple relative backgrounds along multiple directions when the hole is surrounded by the foreground. The weight assignment unit respectively assigns weights to the relative backgrounds. The filling unit selects an extremum from the weights, and fills the hole according to the relative background corresponding to the extremum.

18 Claims, 8 Drawing Sheets

(56) References Cited

U.S. PATENT DOCUMENTS

2012/0230603 A1* 9/2012 Lee et al. .................. 382/275
2012/0281906 A1* 11/2012 Appia ....................... 382/154

OTHER PUBLICATIONS

English language translation of abstract of TW200948043 (Published Nov. 16, 2009).

English language translation of abstract of TW200823799 (Published Jun. 1, 2008).

Ndjiki-Nya, et al.: "Depth Image-Based Rendering With Advanced Texture Synthesis for 3-D Video"; IEEE Transactions on Multimedia, vol. 13, No. 3, Jun. 2011; pp. 453-465.

Daribo, et al.: "A Novel Inpainting-Based Layered Depth Video for 3DTV"; IEEE Transactions on Broadcasting, vol. 57, No. 2, Jun. 2011; pp. 533-541.

Sjöström, et al.: "Improved Depth-Image-Based Rendering Algorithm"; Mid Sweden University, SE-85170 Sundsvall, Sweden; 978-1-61284-162-5/11/$26.00 2011 © IEEE; pp. 1-4.

Wang, et al.: "An Asymmetric Edge Adaptive Filter for Depth Generation and Hole Filling in 3DTV"; IEEE Transactions on Broadcasting, vol. 56, No. 3, Sep. 2010; pp. 425-431.

"Improvement of Virtual View Rendering Based Depth Image", Hu Dong, 2011 Sixth International Conference on Image and Graphics, IEEE Computer Society (2011).

* cited by examiner

IMAGE PROCESSING APPARATUS AND IMAGE PROCESSING METHOD

This application claims the benefits of U.S. provisional application No. 61/613,501, filed Mar. 21, 2012, and Taiwan application Serial No. 101131521, filed Aug. 30, 2012, the disclosure of which are incorporated by reference herein in its entirety.

TECHNICAL FIELD

The disclosed embodiments relate to an image processing apparatus and an image processing method.

BACKGROUND

As the display technology continues to progress, presentation of stereoscopic images has gradually evolved from stereoscopic display devices cooperating with special glasses worn by users to autostereoscopic display devices that no longer require the special glasses. With a stereoscopic display device that requires special glasses, a viewer can observe stereoscopic images on the basis of two two-dimensional images respectively corresponding to left and right eyes. However, for an autostereoscopic display device that requires no special glasses, various factors must be taken into consideration, such as head movements of viewers, change in positions of viewers, and different viewing angles of multiple viewers viewing simultaneously. Therefore, multiple two-dimensional images need to be filmed from different angles (e.g., nine angles) to compose a stereoscopic image.

To alleviate pseudoscopy resulted by change in positions, high-level autostereoscopic display devices need numerous multi-angle images (e.g., 36 or 72 angles) to compose stereoscopic images. However, capturing images using video cameras in such a greater number is impractical. Thus, in real situations, one or two video cameras are utilized for capturing (original) images, which are coordinated with corresponding disparity maps (storing distances between respective objects in a two-dimensional image and a reference plane). Images projected from different angles and corresponding disparity maps are then calculated to compose stereoscopic images with wide viewing angles.

When calculating the projected images of the various viewing angles, a part that is occluded by the foreground in an original image may be revealed when viewing from different angles. A hole is formed as no sufficient information is available for filling the disoccluded part. To solve this problem, a reasonable value should be first filled in the hole in the disparity map, so that appropriate image data can be searched for or calculated to fill the hole in the image.

In the prior art, a minimum disparity value of neighboring regions of the hole in the disparity map, or a minimum disparity value of the whole disparity map is found for filling the hole. However, both of the two approaches above encounter the following two issues. One issue is that no reasonable value can be found from the neighboring regions to fill the hole when the hole is surrounded by the foreground. The other issue is that filling the hole by a minimum disparity value of the whole disparity map is unreasonable in a multi-layer scene.

SUMMARY

The disclosure is directed to an image processing apparatus and an image processing method.

According to one embodiment, an image processing apparatus is provided. The image processing apparatus includes a determination unit, a search unit, a weight assignment unit, and a filling unit. The determination unit determines whether a hole is surrounded by the foreground in a disparity map or a depth map. When the hole is surrounded by the foreground, the search unit searches for multiple relative backgrounds along multiple directions. The weight assignment unit respectively assigns weights to the relative backgrounds. The filling unit selects an extremum from the weights, and fills the hole according to the relative background corresponding to the extremum.

According to one embodiment, an image processing method is provided. The method includes: determining whether a hole is surrounded by the foreground in a disparity map or a depth map; searching for multiple relative backgrounds along multiple directions when the hole is surrounded by the foreground; respectively assigning weights to the relative backgrounds; and selecting an extremum from the weights, and filling the hole according to the relative background corresponding to the extremum.

Figure 1:
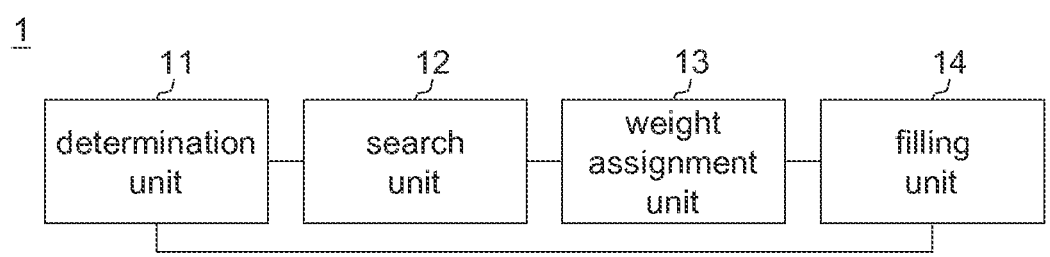
FIG. 1 is a block diagram of an image processing apparatus according to a first embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

First Embodiment

Figure 2:
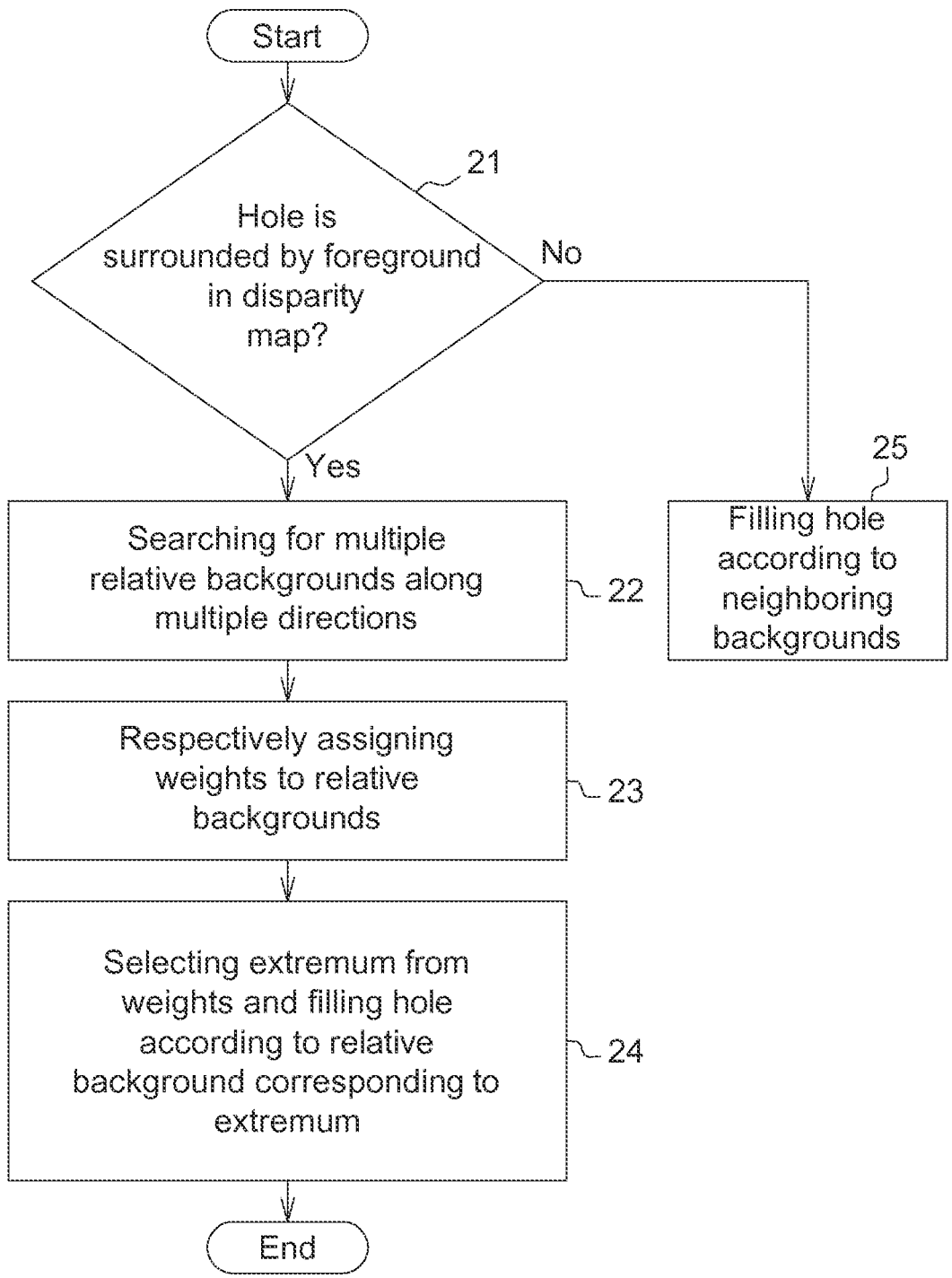
FIG. 2 is a flowchart of an image processing method.
Figure 3:
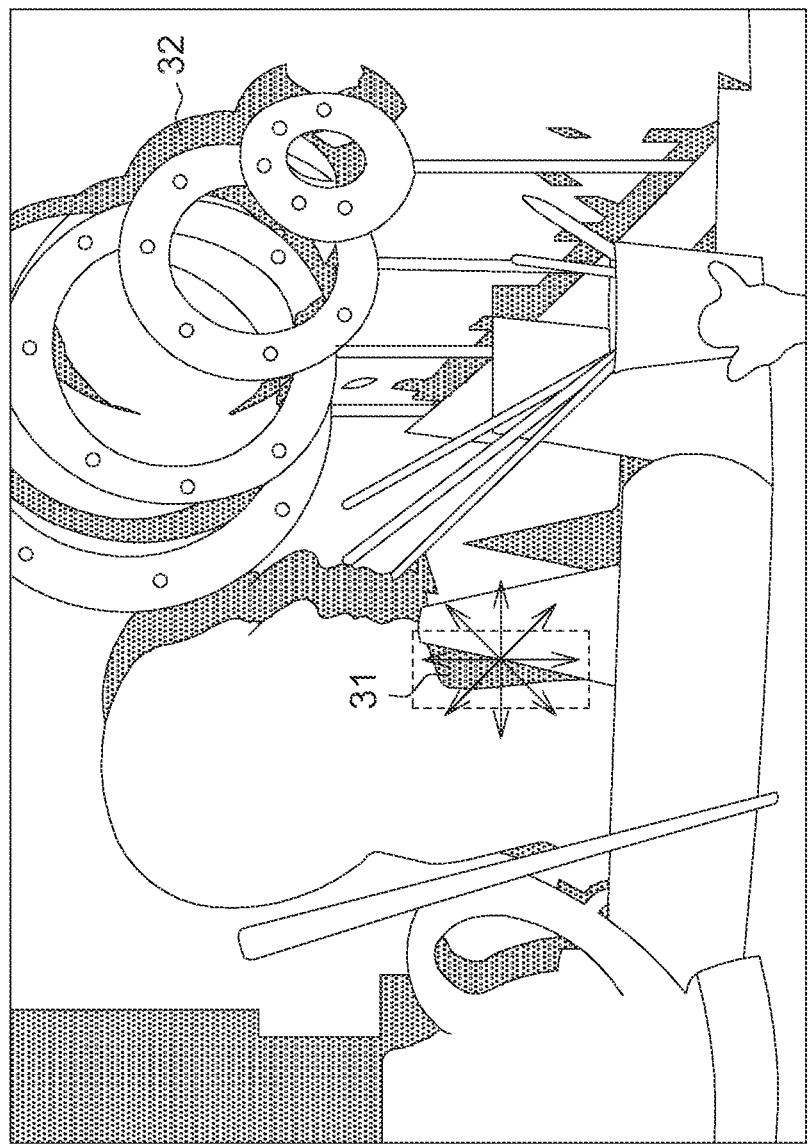
FIG. 3 is a schematic diagram of searching for relative backgrounds along multiple directions.

FIG. 1 shows a block diagram of an image processing apparatus according to a first embodiment; FIG. 2 shows a flowchart of an image processing method; FIG. 3 shows a schematic diagram of searching for relative backgrounds along multiple directions. Referring to FIGS. 1, 2 and 3, an image processing apparatus 1 includes a determination unit 11, a search unit 12, a weight assignment unit 13, and a filling unit 14. The determination unit 11, the search unit 12, the weight assignment unit 13, and the filling unit 14 can be implemented by an application-specific integrated circuit (ASIC), a system-on chip (SoC), a processor or other similar devices.

The image processing method, applicable to the image processing apparatus 1, includes the following steps. In step 21, the determination unit 11 determines whether a hole 31 is surrounded by the foreground in a disparity map 3. Further, the disparity map 3 may be first converted to a depth map, and the determination unit 11 determines whether the hole 31 is surrounded by the foreground in the depth map. In step 22, the search unit 12 searches for multiple relative backgrounds along multiple directions when the hole 31 is surrounded by the foreground. In step 23, the weight assignment unit 13 respectively assigns weights W to the relative backgrounds.

The weights W may be calculated based on different methods. For example, the weight assignment unit 13 generates the weight W according to a disparity value D and a distance d. The disparity value D represents a disparity value of a corresponding relative background. In general, the disparity value ranges between 0 and 255, where 0 represents an unknown (i.e., a hole), 1 represents a farthest object and 255 represents a nearest object. In other words, the disparity value of background is smaller than that of the foreground. In practice, the disparity map may be converted to a depth map. Alternatively, the hole, the nearest object and the farthest object may be defined by different disparity values or depth values. The distance d represents a distance between the relative background and the hole 31. The distance d gets smaller as the relative background is closer to the hole 31 or gets larger as the relative background is farther away from the hole 31. The equation of this method can be expressed as weight W=f (disparity value D, distance d), where the disparity value D and the distance d are parameters of the function f. In one embodiment, weight W=1/(disparity D×distance d); in an alternative embodiment, weight W=disparity D×distance d. The method for calculating the weight W may be in other calculation combinations, and are not limited to a product or a reciprocal of a product of the disparity value D and the distance d.

Further, the weight assignment unit 13 may also generate the weight W according to the disparity value D, the distance d and a direction A. The equation of this method can be expressed as weight W=f (disparity value D, distance d, direction A), where the disparity value D, the distance d and the direction A are parameters of the function f.

In step 24, the filling unit 14 selects an extremum from the weights, and fills the hole 31 according to the relative background corresponding to the extremum. More specifically, the filling unit 15 fills the hole according to the disparity value of the relative background corresponding to the extremum. It should be noted that, the extremum is a maximum weight or a minimum weight, depending on the definition of disparity value or depth value corresponding to the background. The selected extremum means that the relative background is close to the hole and has a small disparity value, and thus the corresponding disparity is considered as a most reasonable value to fill the hole. In step 25, when a hole 32 is not surrounded by the foreground, the filling unit 15 selects a minimum disparity value of a neighboring background to fill the hole 32.

Figure 4:
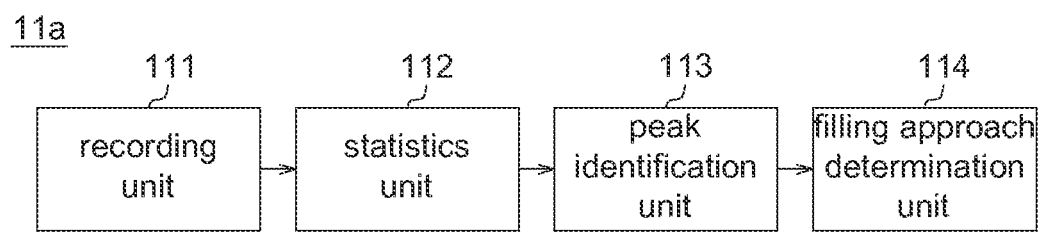
FIG. 4 is a block diagram of a determination unit according to a first embodiment.
Figure 5:
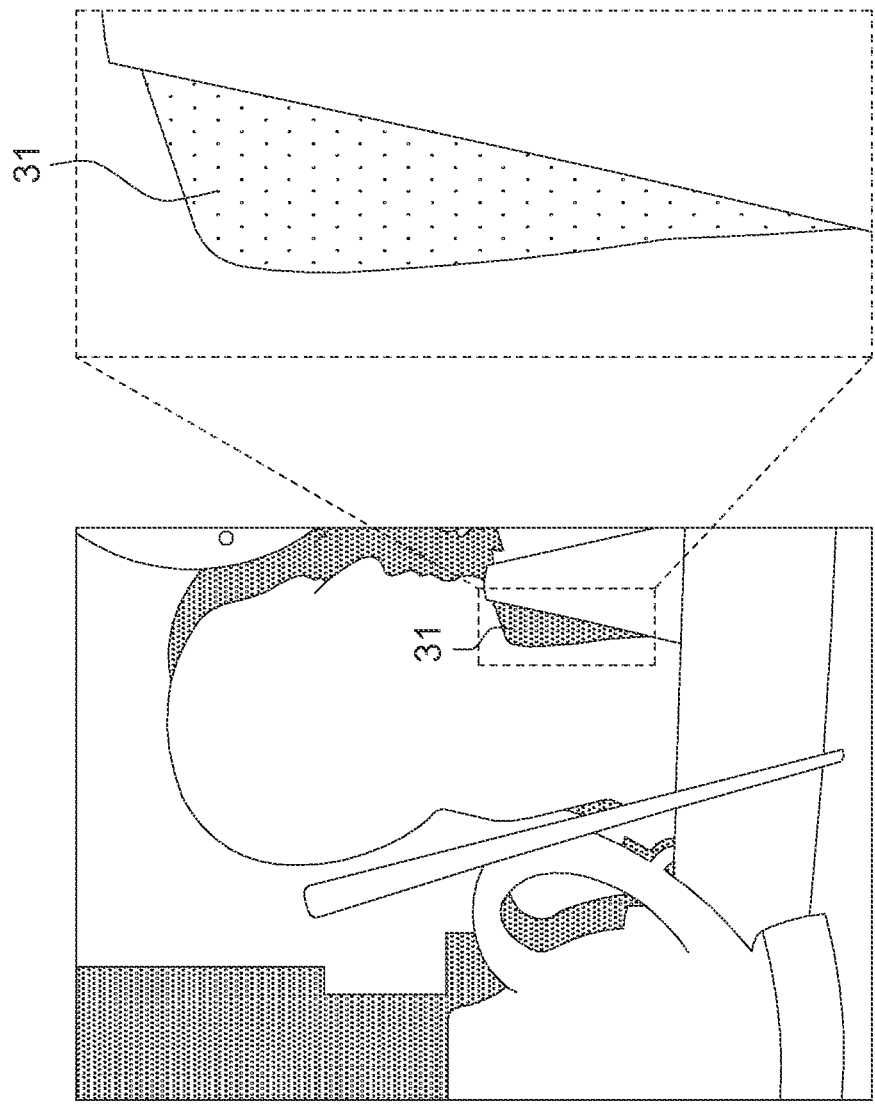
FIG. 5 is a partial schematic diagram of FIG. 3.
Figure 6:
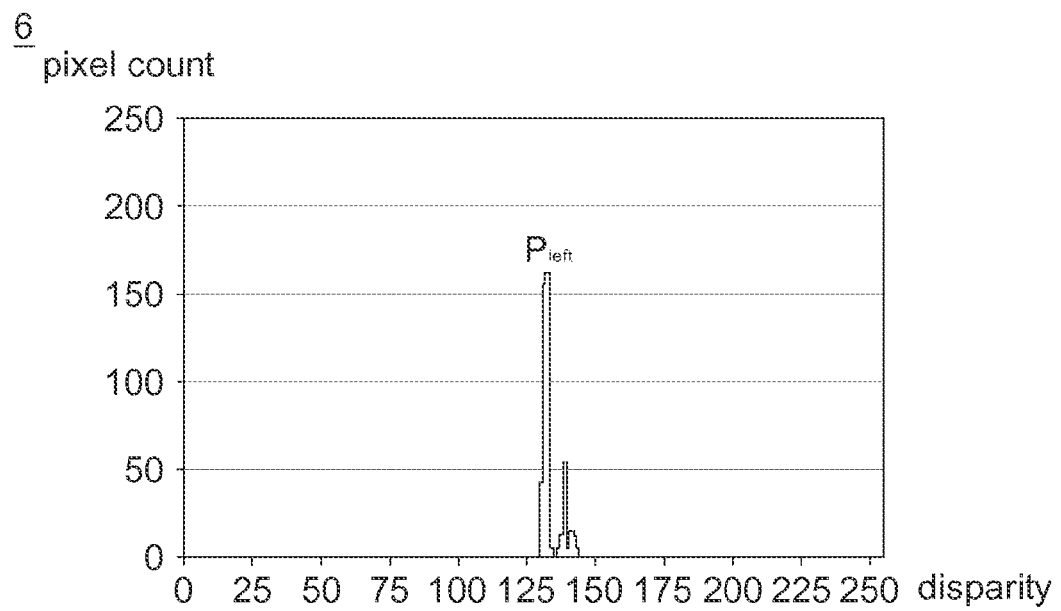
FIG. 6 is a schematic diagram of left-side disparity statistics of the hole 31 in FIG. 5.
Figure 7:
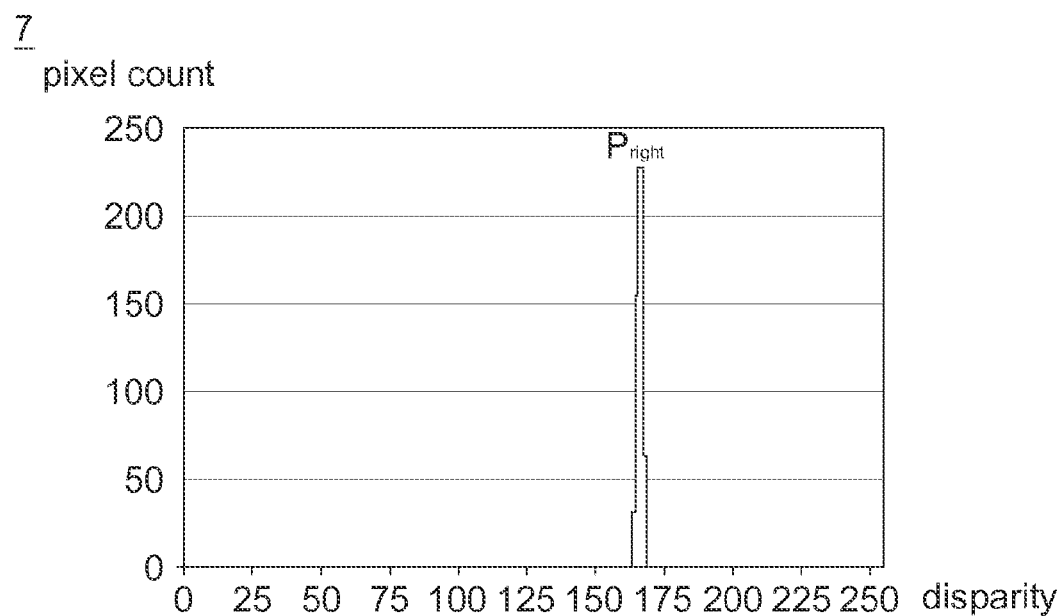
FIG. 7 is a schematic diagram of right-side disparity statistics of the hole 31 in FIG. 5.

FIG. 4 shows a block diagram of a determination unit according to the first embodiment; FIG. 5 shows a partial schematic diagram of FIG. 3; FIG. 6 shows a schematic diagram of the left-side disparity statistics of the hole 31 in FIG. 5; FIG. 7 shows a schematic diagram of the right-side disparity statistics of the hole 31 in FIG. 5. A determination unit 11a in FIG. 4 is taken as an example for the foregoing determination unit. Referring to FIGS. 4 to 7, the determination unit 11a includes a recording unit 111, a statistics unit 112, a peak identification unit 113, and a filling approach determination unit 114. The recording unit 111 records disparity values of the left side of the hole 31 to a left group, and records disparity values of the right side of the hole 31 to a right group. The statistics unit 112 generates left-side disparity statistics 6 as shown in FIG. 6 according to the left group, and generates right-side disparity statistics 7 as shown in FIG. 7 according to the right group. The left-side disparity statistics 6 in FIG. 6 may be regarded as a disparity distribution at the left side of the hole 31. The right-side disparity statistics 7 in FIG. 7 may be regarded as a disparity distribution at the right side of the hole 31. The peak identification unit 113 identifies a background peak value $P_{left}$ according to the left-side disparity statistics 6, and identifies a background peak value $P_{right}$ according to the right-side disparity statistics 7. The background peak value $P_{left}$ is a peak value having a minimum disparity value in the left-side disparity statistics 6, and the background peak value $P_{right}$ is a peak value having a minimum disparity value in the right-side disparity statistics 7. The filling approach determination unit 114 determines whether the hole 31 is surrounded by the foreground according to the background peak value $P_{left}$ and the background peak value $P_{right}$.

When the disparity map is a right-side disparity map, the filling approach determination unit 114 determines that the hole 31 is surrounded by the foreground if the background peak value $P_{right}$ is greater than or equal to the background peak value $P_{left}$. Conversely, the filling approach determination unit 114 determines that the hole 31 is not surrounded by the foreground if the background peak value $P_{right}$ is smaller than the background peak value $P_{left}$.

Similarly, when the disparity map is a left-side disparity map, the filling approach determination unit 114 determines that the hole 31 is surrounded by the foreground if the background peak value $P_{left}$ is greater than or equal to the background peak value $P_{right}$. Conversely, the filling approach determination unit 114 determines that the hole 31 is not surrounded by the foreground if the background peak value $P_{left}$ is smaller than the background peak value $P_{right}$.

Figure 8:
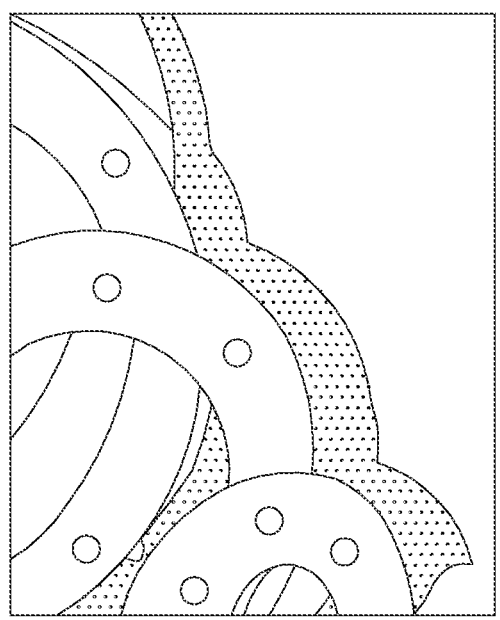
FIG. 8 is a partial schematic diagram of FIG. 3.
Figure 9:
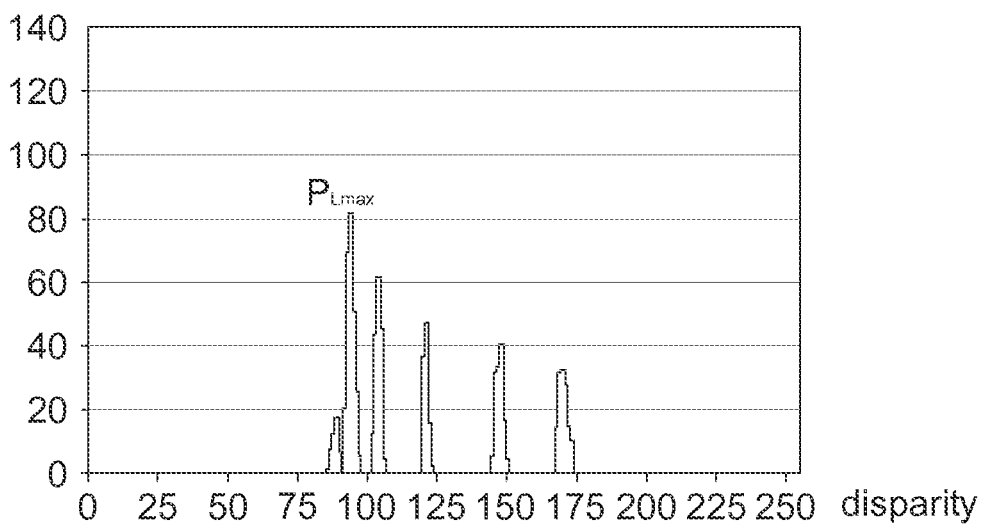
FIG. 9 is a schematic diagram of left-side disparity statistics according to FIG. 8.
Figure 10:
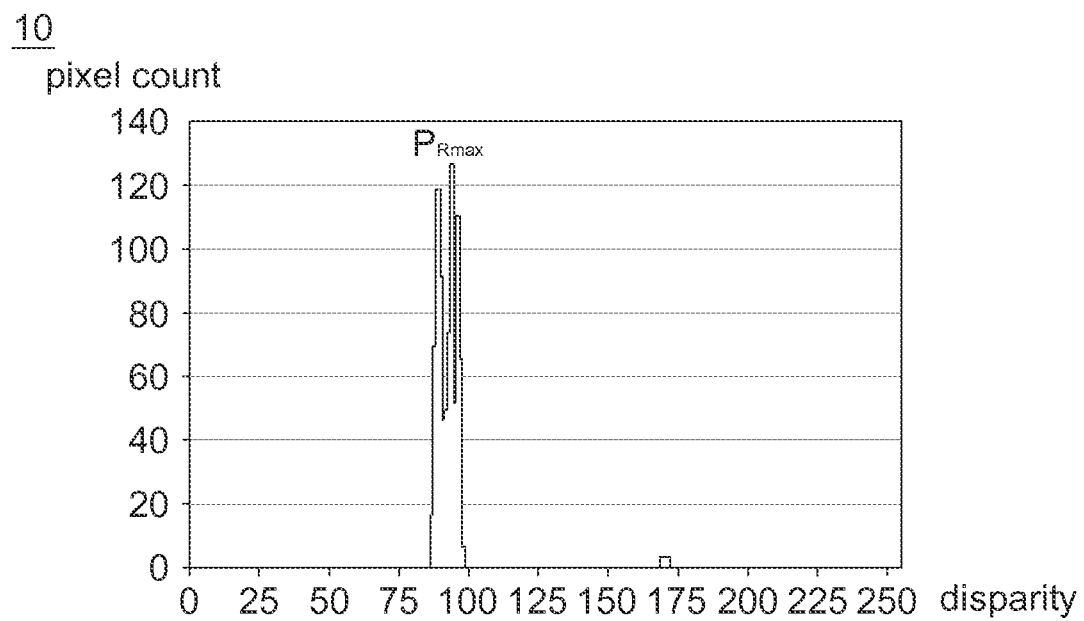
FIG. 10 is a schematic diagram of right-side disparity statistics according to FIG. 8.

FIG. 8 shows a partial schematic diagram of FIG. 3; FIG. 9 shows a schematic diagram of the left-side disparity statistics in FIG. 8; FIG. 10 shows a schematic diagram of the right-side disparity statistics in FIG. 8. The peak identification unit 113 further suppresses influences of noises by omitting small peak values that are smaller than a threshold. The peak identification unit 113 compares the peak values of the left-side disparity statistics 9 to a first threshold, and compares the peak values of the right-side disparity statistics 10 to a second threshold. From peak values greater than the first threshold, the peak identification unit 113 selects a peak value of a minimum disparity value in the left-side disparity statistics 9 to serve as the foregoing background peak value. From peak values greater than the second threshold, the peak identification unit 113 further selects a peak value of a minimum disparity value in the right-side disparity statistics 10 to serve as the foregoing background peak value. The first threshold and the second threshold may be adjusted depending on actual application requirements. In an embodiment, the first threshold=left-side maximum peak value $P_{Lmax}/4$, and the right threshold=right-side maximum peak value $P_{Rmax}/4$.

Second Embodiment

Figure 11:
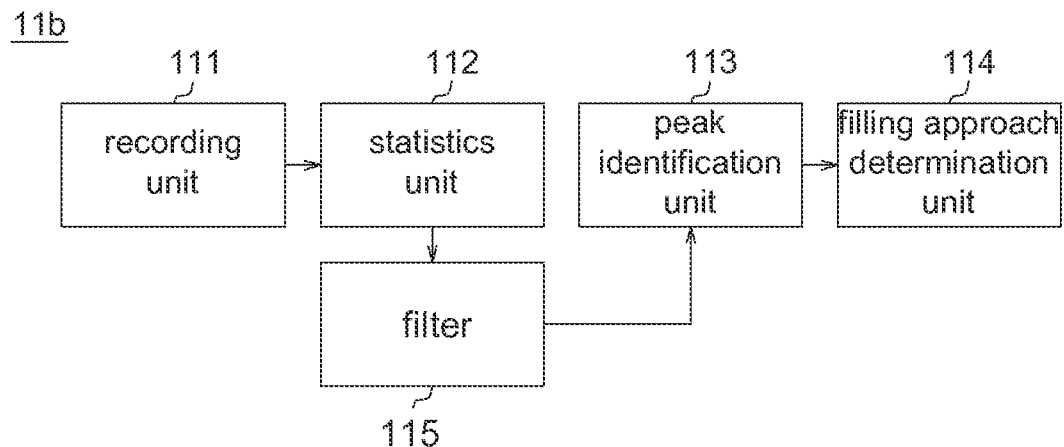
FIG. 11 is a block diagram of a determination unit according to a second embodiment.

FIG. 11 shows a block diagram of a determination unit according to a second embodiment. A determination unit 11b in FIG. 11 is taken as an example for the foregoing determination unit. In the second embodiment, a filter 115 is utilized to process negligibly small peak values to suppress influences of noises. The filter in the determination unit 11b can be a mean filter or other type of filters that removes negligibly small peak values from left-side disparity statistics to generate left-side filtered disparity statistics, and removes negligibly small peak values from right-side disparity statistics to generate right-side filtered disparity statistics. The peak identification unit 113 searches for a peak value of a minimum disparity value in the left-side filtered disparity statistics to serve as a background peak value, and searches for a peak value of a minimum disparity value in the right-side filtered disparity statistics to serve as a background peak value.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An image processing method, comprising:
   determining whether a hole is surrounded by the foreground in a disparity map or a depth map;
   searching for a plurality of relative backgrounds along a plurality of directions when the hole is surrounded by the foreground;
   respectively assigning a plurality of weights to the plurality of relative backgrounds; and
   selecting an extremum from the weights, and filling the hole according to the relative background corresponding to the extremum.

2. The image processing method according to claim 1, wherein the step of determining whether the hole is surrounded by the foreground comprises:
   recording disparity values of a left side of the hole to a left group, and recording disparity values of a right side of the hole to a right group;
   generating left-side disparity statistics according to the left group, and generating right-side disparity statistics according to the right group;
   identifying a first background peak value according to the left-side disparity statistics, and identifying a second background peak value according to the right-side disparity statistics; and
   determining whether the hole is surrounded by the foreground according to the first background peak value and the second background peak value.

3. The image processing method according to claim 2, wherein the determining step further comprises:
   filtering the left-side disparity statistics to remove negligibly small peak values for generating left-side filtered disparity statistics, and filtering the right-side disparity statistics to remove negligibly small peak values for generating right-side filtered disparity statistics; and
   searching for the first background peak value in the left-side filtered disparity statistics, and searching for the second background peak value in the right-side filtered disparity statistics.

4. The image processing method according to claim 2, wherein the step of identifying the first background peak value and the second background peak value further comprises:
   comparing the peak values of the left-side disparity statistics to a first threshold, and comparing the peak values of the right-side disparity statistics to a second threshold; and
   selecting the first background peak value in the left-side disparity statistics from the peak values greater than the first threshold, and selecting the second background peak value in the right-side disparity statistics from the peak values greater than the second threshold.

5. The image processing method according to claim 2, wherein when the disparity map is a right-side disparity map, it is determined that the hole is surrounded by the foreground when the second background peak value is greater than or equal to the first background peak value, and it is determined that the hole is not surrounded by the foreground when the second background peak value is smaller than the first background peak value.

6. The image processing method according to claim 2, wherein when the disparity map is a left-side disparity map, it is determined that the hole is surrounded by the foreground when the first background peak value is greater than or equal to the second background peak value, and it is determined that the hole is not surrounded by the foreground when the first background peak value is smaller than the second background peak value.

7. The image processing method according to claim 1, wherein the assigning step calculates the weights according to disparity values of the relative backgrounds and distances between the relative backgrounds and the hole.

8. The image processing method according to claim 1, wherein the assigning step calculates the weights according to disparity values of the relative backgrounds, distances between the relative backgrounds and the hole, and a plurality of directions corresponding to the relative backgrounds.

9. The image processing method according to claim 1, wherein the filling step fills the hole according to a disparity value of the relative background corresponding to the extremum.

10. An image processing apparatus, comprising:
    a determination unit, for determining whether a hole is surrounded by the foreground in a disparity map or a depth map;
    a search unit, for searching for a plurality of relative backgrounds along a plurality of directions when the hole is surrounded by the foreground;
    a weight assignment unit, for respectively assigning a plurality of weights to the plurality of relative backgrounds; and
    a filling unit, for selecting an extremum from the weights, and filling the hole according to the relative background corresponding to the extremum.

11. The image processing apparatus according to claim 10, wherein the determination unit comprises:
    a recording unit, for recording disparity values of a left side of the hole to a left group, and recording disparity values of a right side of the hole to a right group;
    a statistics unit, for generating left-side disparity statistics according to the left group, and generating right-side disparity statistics according to the right group;
    a peak identification unit, for identifying a first background peak value according to the left-side disparity statistics, and identifying a second background peak value according to the right-side disparity statistics; and
    a filling approach determination unit, for determining whether the hole is surrounded by the foreground according to the first background peak value and the second background peak value.

12. The image processing apparatus according to claim 11, wherein the determination unit further comprises:
    a filter, for performing on the left-side disparity statistics to remove negligibly small peak values to generate left-side filtered disparity statistics, and performing on the right-side disparity statistics to remove negligibly small peak values to generate right-side filtered disparity statistics; and wherein, the peak identification unit searches for the first background peak value in the left-side filtered disparity statistics, and searches for the second background peak value in the right-side filtered disparity statistics.

13. The image processing apparatus according to claim 11, wherein the peak identification unit compares the peak values of the left-side disparity statistics to a first threshold, and compares the peak values of the right-side disparity statistics to a second threshold; and the peak identification unit selects the first background peak value in the left-side disparity statistics from the peak values greater than the first threshold, and selects the second background peak value in the right-side disparity statistics from the peak values greater than the second threshold.

14. The image processing apparatus according to claim 12, wherein when the disparity map is a right-side disparity map, it is determined that the hole is surrounded by the foreground when the second background peak value is greater than or equal to the first background peak value, and it is determined that the hole is not surrounded by the foreground when the second background peak value is smaller than the first background peak value.

15. The image processing apparatus according to claim 12, wherein when the disparity map is a left-side disparity map, it is determined that the hole is surrounded by the foreground when the first background peak value is greater than or equal to the second background peak value, and it is determined that the hole is not surrounded by the foreground when the first background peak value is smaller than the second background peak value.

16. The image processing apparatus according to claim 10, wherein the weight assignment unit calculates the weights according to disparity values of the relative backgrounds and distances between the relative backgrounds and the hole.

17. The image processing apparatus according to claim 10, wherein the weight assignment unit calculates the weights according to disparity values of the relative backgrounds, distances between the relative backgrounds and the hole, and a plurality of directions corresponding to the relative backgrounds.

18. The image processing apparatus according to claim 10, wherein the filling unit fills the hole according to a disparity value of the relative background corresponding to the extremum.

\* \* \* \* \*